US006496192B1

United States Patent
Shreesha et al.

(10) Patent No.: US 6,496,192 B1
(45) Date of Patent: Dec. 17, 2002

(54) MODULAR ARCHITECTURE FOR IMAGE TRANSPOSITION MEMORY USING SYNCHRONOUS DRAM

(75) Inventors: Vasanth Shreesha, Maple Shade, NJ (US); David Nasoff, Cherry Hill, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/368,626

(22) Filed: Aug. 5, 1999

(51) Int. Cl.[7] .............................................. G09G 5/399
(52) U.S. Cl. ..................... 345/540; 345/531; 345/534; 345/539
(58) Field of Search ................................ 345/540, 539, 345/531, 538, 534, 545, 571, 564, 418, 428, 427, 649, 656–659; 358/443, 444; 398/441, 583; 382/232, 293–297; 365/189.01, 189.04; 711/100, 5, 168, 157

(56) References Cited

U.S. PATENT DOCUMENTS

| | | | | |
|---|---|---|---|---|
| 4,783,834 A | * | 11/1988 | Anderson et al. ............ | 345/656 |
| 4,918,527 A | * | 4/1990 | Prnard et al. .......... | 365/189.04 |
| 5,048,104 A | * | 9/1991 | D'Aoust et al. ............. | 358/443 |
| 5,175,808 A | * | 12/1992 | Sayre .......................... | 345/647 |
| 5,220,428 A | * | 6/1993 | Billing et al. ................ | 348/583 |
| 5,299,300 A | * | 3/1994 | Femal et al. ................. | 345/428 |
| 5,479,525 A | * | 12/1995 | Nakamura et al. .......... | 345/658 |
| 5,587,742 A | | 12/1996 | Hau et al. .................... | 348/441 |
| 5,848,192 A | * | 12/1998 | Smith et al. ................. | 382/232 |

OTHER PUBLICATIONS

A Memory efficient method for fast transposing run–length encoded images by Misra et al, Proceedings of the 5th international conference on document analysis an drecognition. Sep. 20–22, 1999.*

"An efficient implemeentation of affine transformation using one–dimensional FFT's" by Pang et al, 1997 IEEE International Conference on Acoustic, Sppech and Signal Processing, vol. 4, 1997, pp. 2885–2888.*

16 Mb Synchronous DRAM–Die Revision D, IBM Corporation, 1/98, pp. 1–41.

* cited by examiner

*Primary Examiner*—Kee M. Tung
(74) *Attorney, Agent, or Firm*—RatnerPrestia

(57) ABSTRACT

A memory architecture for a video transpose memory employs SDRAM memory devices which are arranged in memory rows such that elements in a single row may be accessed without memory set-up latency. The memory architecture includes at least two memory banks such that memory write operations to one bank may be interleaved with memory write operations to the other bank. Samples of the image along one direction are stored into the memory in groups such that corresponding samples in the orthogonal direction are held in the same memory row. The memory banks are interleaved on the store operation such that consecutive write operations access respective memory rows in the alternating memory banks. The number of samples in a group of samples is selected such that the total time for displaying the number of samples in the group is at least equal to the set-up latency of the memory. Accordingly, consecutive groups of samples may be stored into the alternating memory banks continuously. When image data are read from memory, the memory read operations are not interleaved. To compensate for the set-up latency in the read operations, the controller advances the first read operation for a particular image line or image column into the horizontal or vertical blanking interval by an amount of time equal to the total latency for the line or column. The system includes a first in first out (FIFO) buffer which receives the image data as it is provided from the memory in response to the memory read requests and provides the image data according to the output timing for the transpose memory.

11 Claims, 7 Drawing Sheets

|  | 216 | | 218 | | 220 | | 222 | |
|---|---|---|---|---|---|---|---|---|
|  | BANK 0 | BANK 1 | BANK 0 | BANK 1 | BANK 0 | BANK 1 | BANK 0 | BANK 1 |
| ROW 0 | L1S1-8 | L33S1-8 | L65S1-8 | L97S1-8 | L129S1-8 | L161S1-8 | L193S1-8 | L225S1-8 |
| ROW 1 | L257S1-8 | L289S1-8 | L321S1-8 | L353S1-8 | L385S1-8 | L417S1-8 | L449S1-8 | L481S1-8 |
| ROW 7 | L1793 S1-8 | L1825 S1-8 | L1857 S1-8 | L1889 S1-8 | L1921 S1-8 | L1953 S1-8 | L1985 S1-8 | L2017 S1-8 |
| ROW 8 | L225S9-16 | L1S9-16 | L33S9-16 | L65S9-16 | L97S9-16 | L129S9-16 | L161S9-16 | L193S9-16 |
| ROW 15 | L2017 S9-16 | L1793 S9-16 | L1825 S9-16 | L1857 S9-16 | L1889 S9-16 | L1921 S9-16 | L1953 S9-16 | L1985 S9-16 |
| ROW 2047 | L1825 S2041 -2048 | L1857 S2041 -2048 | L1889 S2041 -2048 | L1921 S2041 -2048 | L1953 S2041 -2048 | L1985 S2041 -2048 | L2017 S2041 -2048 | L1793 S2041 -2048 |

|  | BANK 0 | | | | BANK 1 | | | |
|---|---|---|---|---|---|---|---|---|
| ROW 0 | L1S1-8 | L65S1-8 | L129S1-8 | L193S1-8 | L33S1-8 | L97S1-8 | L161S1-8 | L225S1-8 |
| ROW 1 | L257S1-8 | L321S1-8 | L385S1-8 | L449S1-8 | L289S1-8 | L353S1-8 | L417S1-8 | L481S1-8 |
| ROW 7 | L1793 S1-8 | L1857 S1-8 | L1921 S1-8 | L1995 S1-8 | L1825 S1-8 | L1889 S1-8 | L1953 S1-8 | L2017 S1-8 |
| ROW 8 | L129S9-16 | L33S9-16 | L97S9-16 | L1615S9-16 | L1S9-16 | L65S9-16 | L129S9-16 | L193S9-16 |
| ROW 15 | L2017 S9-16 | L1825 S9-16 | L1899 S9-16 | L1953 S9-16 | L1793 S9-16 | L1867 S9-16 | L1921 S9-16 | L1985 S9-16 |
| ROW 2047 | L1825 S2041 -2048 | L1889 S2041 -2048 | L1953 S2041 -2048 | L2017 S2041 -2048 | L1857 S2041 -2048 | L1921 S2041 -2048 | L1985 S2041 -2048 | L1793 S2041 -2048 |

FIG. 4B

MODULAR ARCHITECTURE FOR IMAGE TRANSPOSITION MEMORY USING SYNCHRONOUS DRAM

BACKGROUND OF THE INVENTION

The present invention is directed to digital memory architecture, and in particular to an Architecture for an image transposition memory which uses synchronous DRAM memory devices.

Image transposition memories are used in many applications in which a video image needs to be filtered in both the horizontal and vertical directions. While this filtering may be performed using a two-dimensional spatial filter, as filter kernel sizes increase this option becomes less and less economical. It is well known that many two-dimensional image filters may be decomposed into separate one-dimensional horizontal and vertical filters. This type of decomposition is especially desirable when the filtering process requires a relatively large kernel size.

When an image is processed using separate one dimensional filters, the image data for the rows of the image are processed sequentially, the image is stored and then the samples in the image columns are processed sequentially. The switch from handling sequential samples in image rows to sequential samples in image columns is achieved using an image transposition memory. In a memory of this type, image data are written into the memory as a sequence of samples following the image rows while the image data is read from the memory as a sequence of samples following the image columns.

FIG. 1 is a block diagram of a prior art image format conversion system. In this system, input data are provided to a one-dimensional horizontal interpolator 110, which changes the number of samples in the image by resizing the image. In an exemplary format converter, the image is first processed in the horizontal direction and then in the vertical direction. The image data provided by the horizontal interpolator 110 is stored into a transpose memory 112. The transpose memory 112 stores the image data as consecutive samples in raster scan order (i.e. as horizontal lines of samples). The vertical interpolator 114 then reads the samples from transpose memory 112 in column order (i.e. as consecutive samples taken along each column of the image). The interpolator 114 may, for example, perform the same function as the interpolator 110, to provide image data which is scaled in the same proportion in both the horizontal and vertical directions. The samples provided by the vertical interpolator 114, however, are not in raster scan order. Accordingly, these samples are applied to a second transpose memory 116, which stores the image data as consecutive samples along each column of the image and then provides the image data in raster scan order.

To perform a transpose operation, the entire image from one field or frame of a video signal is written into the transpose memory during one field or frame interval and then read out of the transpose memory during the next field or frame interval. As video signals are continuous, this type of access is typically achieved by configuring two field or frame memories in a Ping-Pong arrangement such that image data may be stored into one memory while it is being read from the other memory.

For real time applications, such as a format converter, it is also desirable for the entire memory to be written into or read from in a single field or frame interval. Typically, these speeds are achieved using static random access memory (SRAM). This type of memory, tends to be much more expensive than the more prevalent synchronous dynamic random access memory (SDRAM). Accordingly, it would desirable to provide a memory architecture in which a transpose memory could be made using SDRAM memory devices.

SUMMARY OF THE INVENTION

The present invention is embodied in a memory architecture for a transpose memory which employs SDRAM memory devices.

According to one aspect of the invention, data in the memory is arranged in rows such that elements in a single row may be accessed without latency. The memory architecture includes at least two memory banks such that memory write operations to one bank may be interleaved with memory write operations to the other bank. Samples of the image along one direction are stored into the memory in groups such that corresponding samples in the orthogonal direction are held in the same memory row. The memory write operations are interleaved such that consecutive write operations access respective memory rows in the alternating memory banks. The number of samples in a group of samples is selected such that the total time for displaying the number of samples in the group is at least equal to the set-up latency for the next memory write operation. Accordingly, consecutive groups of samples may be stored continuously into the memory by alternating the memory banks into which they are stored.

According to another aspect of the invention, data along each column of the image is not read continuously because the column data is stored in multiple rows and each row change in the SDRAM interrupts the continuous flow of data. To compensate for the latency in the read operations, the controller advances the first read operation for a particular image line or image column into the horizontal or vertical blanking interval by a number of clock periods equal to the total set-up latency for the line or column. The system includes a first in first out (FIFO) buffer which receives the image data as it is provided from the memory in response to the memory read requests and provides the image data according to the output timing for the transpose memory.

According to another aspect of the invention, the image data or a pixel includes 20 bits comprising a 10-bit luminance value and a 10-bit chrominance value. Each frame of memory used in the system includes four one-megabit (Mb) by 16-bit SDRAM devices and one four-Mb by four-bit SDRAM device. Each of these devices includes respective first and second memory banks.

BRIEF DESCRIPTION OF DRAWINGS

FIG. 4A is a memory address diagram which is useful for describing the manner in which image data are stored into the one-Mb by 16-bit memory devices shown in FIG. 2.

FIG. 4B is a memory address diagram which is useful for describing the manner in which image data are stored into the four-Mb by four-bit memory devices shown in FIG. 2.

DETAILED DESCRIPTION

Figure 1:
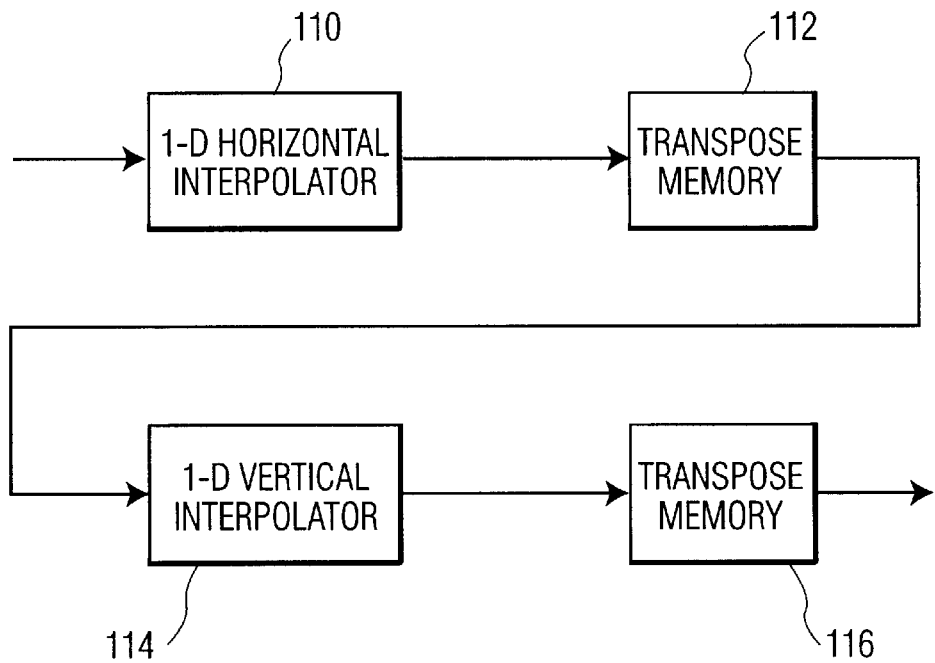
FIG. 1 (Prior Art) is a block diagram of a video image format converter which uses a transpose memory.
Figure 1A:
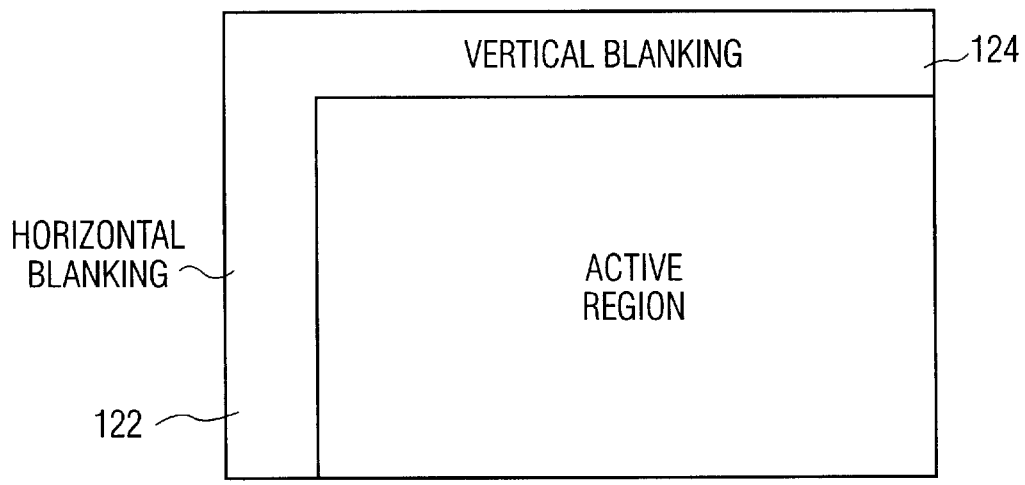
FIG. 1A (Prior Art) is an image diagram showing the active and inactive portions of an image frame.

To understand some aspects of the present invention, it is helpful to understand how image data is used and stored in video signal processing systems. FIG. 1A is an image diagram which shows both the active and inactive regions of a video frame. The active region 120 represents image data which is displayed on the display device (e.g. a cathode ray tube (CRT)). The inactive regions 122 and 124 represent times when the video signal is blanked. Most video signals include two blanking intervals, a horizontal blanking interval 122, which exists between the active signal intervals for successive video lines, and the vertical blanking interval 124, which exists between the active signal intervals for successive video fields or frames. These blanking intervals represent times when the display device is preparing to display the next line, field or frame. For a CRT display, the horizontal blanking interval is the time needed to scan the electron beam from the right side to the left side of the screen and the vertical blanking interval is the time needed to scan the beam from the bottom to the top of the screen. For flat-panel display devices, such as liquid crystal display (LCD) devices, these intervals may be used to provide image data for the next image line to the column drivers (horizontal blanking) of the display device or to transfer a new image field or frame into a display buffer (vertical blanking).

Figure 2:
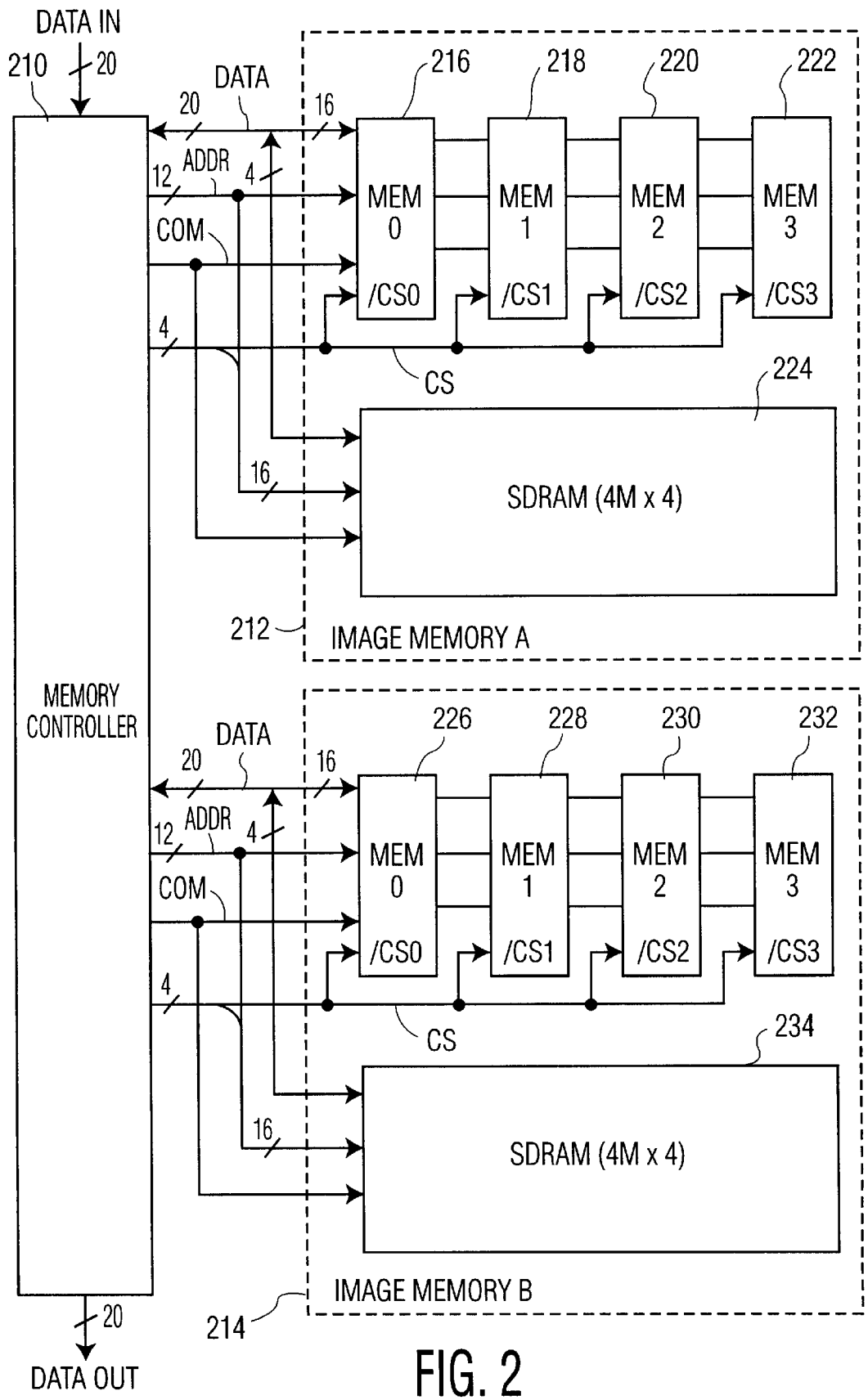
FIG. 2 is a block diagram of a memory system according to the present invention which is suitable for use as one of the transpose memories shown in FIG. 1.

FIG. 2 is a block diagram of an exemplary image transposition memory according to the present invention. The system shown in FIG. 2 includes three basic components: a memory controller 210, an image A memory 212 and an image B memory 214. Each of the image memories 212 and 214 may be, for example, sufficient in size to hold a single field or a single frame of image data. In the exemplary embodiment of the invention shown in FIG. 2, image A memory 212 includes five 16-Mb memories configured as four one-Mb by 16-bit memories 216, 218, 220, 222 and one four-Mb by four-bit memory 224. In the image B memory 214, the one-Mb by 16-bit memories are items 226, 228, 230 and 232 while the four-Mb by four-bit memory is item 234. Each of the memory devices shown in FIG. 2 is coupled to the memory controller 210 via a data line, DATA, address line, ADDR, and a command line, COM. In addition, the four one-Mb by 16-bit memories receive chip select signals (CSC) from the memory controller 210. Each of the memory devices includes two banks, bank one and bank two. In the exemplary embodiment of the invention, the one-Mb by 16-bit memories may be, for example, IBM0316169CT3 SDRAM devices and the four-Mb by four-bit memories may be, for example, IBM0316409CT3 SDRAM devices, both available from IBM corporation.

The two image memories 212 and 214 operate in the same way but at different times. The Ping-Pong configuration of the memories allows image data to be stored into one of the image memories while it is fetched from the other image memory. In addition, the image data may be stored image line by image line in raster-scan order and fetched image column by image column in transposed raster scan order or it may be stored column by column and fetched line by line. For the sake of brevity, operational details are provided for only one of the image memories, 212. In addition, these operational details are described only in terms of storing image lines and fetching image columns. The operation of the image memory 214 is identical to the operation of the memory 212 and the operation of storing image columns and fetching image lines is identical to storing image lines and fetching image columns.

Memory operations to different memory devices or to the separate banks of one memory device may be interleaved such that the data transfer for one memory operation in one memory device or bank may occur concurrently with the memory set-up for the next sequential memory operation in another memory device or bank. In addition, each of the memory devices is arranged as a plurality of memory rows, each memory row including a plurality of memory cells (memory columns). Each memory device includes an internal cache memory (not shown) for each of its memory banks such that, when any memory cell in a memory bank is accessed, the entire memory row in the bank which includes that cell is transferred to the cache memory. Once a memory row has been transferred into the cache, individual memory cells in the row of the bank may be accessed from the cache without latency for memory setup.

Conceptually, the invention operates by storing several adjacent pixel elements, along one dimension of the image (image line or image column), into the memory in a single first memory write operation. While this first write operation is being performed to one bank of the memory device, the next subsequent pixel elements are being prepared to be written into the other bank of the memory device, or into another memory device. Because the second operation is to a different memory device or to a different bank in the same device, its addressing set up may occur at the same time as the data transfer for the first memory write operation.

The pixel data stored in each memory row includes groups of samples which are adjacent in the other direction of the image (image column or image line). In the exemplary embodiment of the invention, each memory write operation to transpose memory 112 stores eight pixel values along a horizontal line of the video image. The memory rows are interleaved such that samples 1 through 8 from, for example, the first 256 horizontal lines of the image are stored using a single memory row address (128 pixel groups in each memory bank). Thus, when the pixels are fetched from the memory along the other direction (i.e. the columns of the image) only one memory addressing operation is used to retrieve the first 128 samples of the column. Separate memory read operations are broadcast to both banks of all of the memory devices before any pixel data is read such that all of the cache memories are filled with the addressed memory row. Pixel elements for the desired image column are then read out of the cache memories in sequence. After reading out the first 256 samples of the column, the memory controller 210 performs two set-up operations to access the two banks of the next memory row to obtain the next 256 samples of the image column.

The memory configuration shown in FIG. 2 holds two images, each image containing up to 4 194 304 (2048×2048)

20-bit pixel values. Each 20-bit pixel value includes a 10-bit luminance value and a 10-bit chrominance value. Referring to the memory 212, the pixel data are arranged such that the eight most significant bits (MSBs) of luminance values and the eight MSBs of the chrominance values are stored in the one-Mb by 16-bit memories 216, 218, 220, 222 while the two least significant bits (LSBs) of the luminance and chrominance values are stored in the four-Mb by four-bit memory 224. The memory shown in FIG. 2 may be configured to handle smaller images or images having pixels with less quantization resolution as shown in Table 1.

TABLE 1

Image Memory Configuration

| Image Width (max) × Image Height (max) | Number of Devices Per Image Memory | |
|---|---|---|
| | [Y, C] 10 bits | [Y, C] 8 bits |
| 2048 × 2048 | 4 (1 Mb × 16) and 1 (4 Mb × 4) | 4 (1 Mb × 16) |
| 2048 × 1536 | 3 (1 Mb × 16) and 1 (4 Mb × 4) | 3 (1 Mb × 16) |
| 2048 × 1024 | 2 (1 Mb × 16) and 1 (4 Mb × 4) | 2 (1 Mb × 16) |
| 2048 × 512 | 1 (1 Mb × 16) and 1 (4 Mb × 4) | 1 (1 Mb × 16) |

In an alternative configuration, the memory addressing scheme may be extended to allow images having a maximum size of 1024×2048 to be stored in less memory than is used in the configurations shown in Table 1. These memory configurations are shown in Table 2

TABLE 2

Image Merging and Splitting Memory Configuration

| Image Width (max) × Image Height (max) | Number of Devices Per Image Memory | |
|---|---|---|
| | [Y, C] 10 bits | [Y, C] 8 bits |
| 1024 × 2048 | 2 (1 Mb × 16) and 1 (4 Mb × 4) | 2 (1 Mb × 16) |
| 1024 × 1024 | 1 (1 Mb × 16) and 1 (4 Mb × 4) | 1 (1 Mb × 16) |

Any of the memory configurations shown in Tables 1 and 2 may be used to merge two fields into a single frame or to split one frame into two fields. Field merging may be achieved by writing the even fields in even memory column addresses and odd fields in odd memory column addresses and then reading the image lines of the two fields together as one frame. Conversely, an image frame may be split into two fields by storing the image frame, as described below, and then reading pixels from the even memory columns to obtain one field and reading pixels from the odd memory columns to obtain the other field. These memory configurations may be used, for example, in the transpose memory 116 (shown in FIG. 1) which receives image data into the memory rows one image column at a time and provides the data from the memory columns one image line at a time. These configurations may be used, for example, to implement the 3–2 pull-down which is used to translate filmed motion pictures, having a frame rate of 24 frames per second into television signals having a frame rate of 30 frames per second, 60 fields per second.

In the exemplary embodiment of the invention, the set-up operations for the memory reads are not interleaved. Because a large number of column entries are stored in a single row, however, only a few memory read set-up operations are performed to fetch a single image column from the memory. In the exemplary embodiment of the invention for a 2048×2048 image, only 8 memory set-up operations (16 memory set-up operations for the memory configurations shown in Table 2) are used to read a column of image data. Each set-up operation is really two operations, one for each bank of the memory. The two operations occur simultaneously, however, and for timing considerations are considered as a single operation.

These 8 (16) set-up operations represent a latency delay in providing the image column data from the memory. To ensure that the image pixels are available in real-time, the subject invention starts the memory read operations before the active interval of the image column by an amount of time equal to the total latency delay for accessing the image column data. As described below with reference to FIG. 8, in the exemplary embodiment of the invention, when image data are written into the memory one image row at a time and are then read from the memory one column at a time the memory read operations which fetch the image column data are advanced in time to start during the time represented by the vertical blanking interval 124 (shown in FIG. 1A). If, as for the transpose memory 116 (shown in FIG. 1), the image data were written into the transpose memory one image column at a time and read out one image line at a time, the advanced memory read operations would extend into the horizontal blanking interval.

Figure 3:
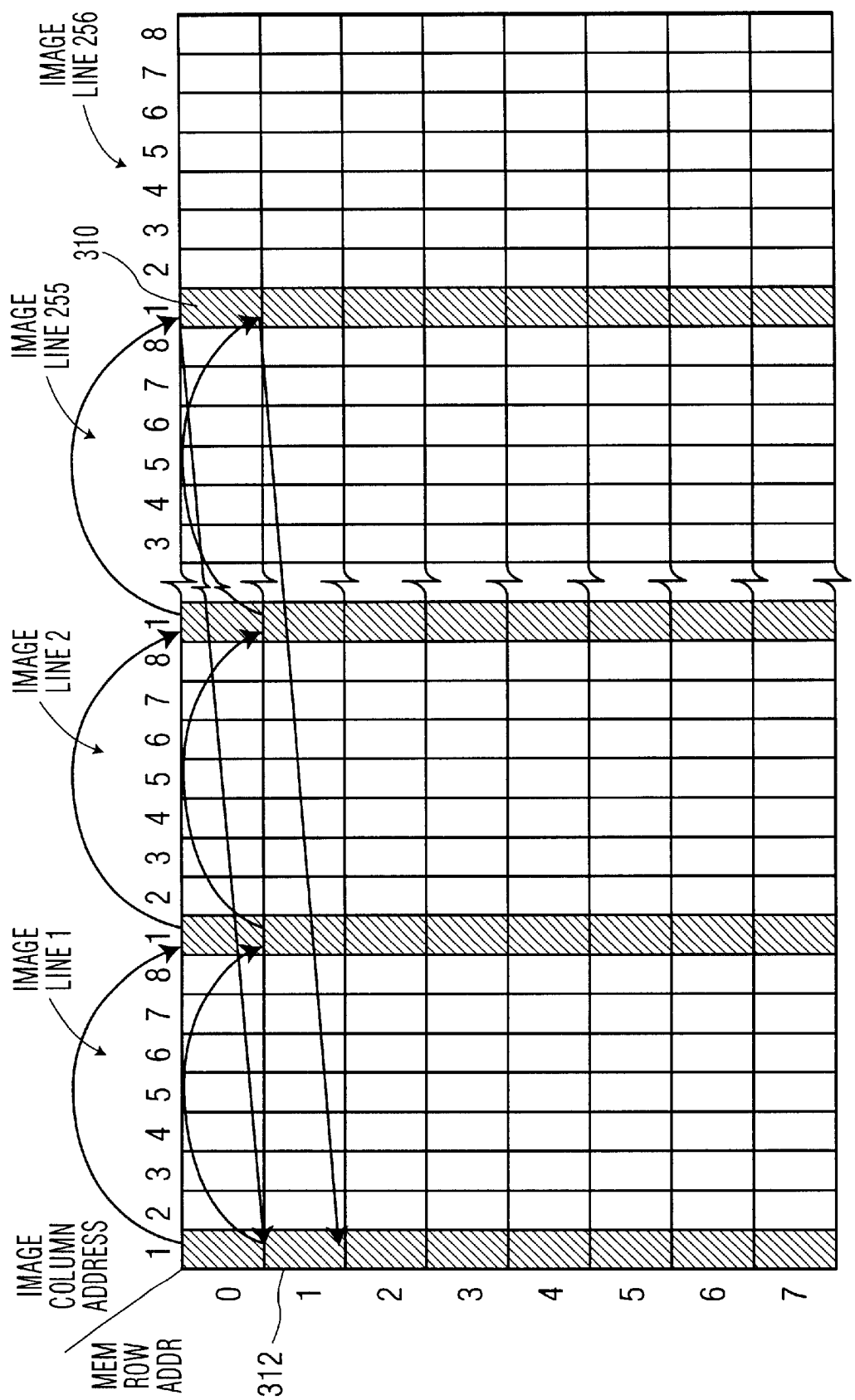
FIG. 3 is a memory address diagram which is useful for describing the way in which rows of samples are stored and columns of samples are accessed in the memory device shown in FIG. 2.

FIG. 3 shows a partial map of the memory 212 or 214 which illustrates an exemplary way in which data is stored into and read from the memory. For the sake of simplicity, the different devices and different banks are not shown in FIG. 3. As shown in FIG. 3, the first eight samples of the first image line are written into the first memory row followed by the first eight samples of the second image line, the first eight samples of the third image line, and so forth until the first eight samples of the 256$^{th}$ image line are the last samples written into the first memory row. As described below with reference to FIGS. 4A, 4B, 5A and 5B, the samples are written into the transpose memory 112 in raster scan order, one line at a time. The end result, however, is a memory pattern such as that shown in FIG. 3.

When samples are read from the memories 112 and 114, consecutive samples from an image column are provided. These samples are the shaded samples shown in FIG. 3. Referring to the transpose memory 112, the samples are accessed by activating memory row 0 in both bank 0 and bank 1. These activation commands are simultaneously applied to all of the memory devices 216, 218, 220, 222 and 224, such that, after executing the two commands, the entire contents of memory row 0 for all of the memory devices are stored in the respective cache memories of the devices.

As described below with reference to FIGS. 6A and 6B, there is significant delay (i.e. latency) between the time the controller 210 issues the first activate command and the time that first sample is provided by the memory 212. After providing the first sample, however, the memory 212 can provide the remaining 255 samples of the first column that are in the first memory row essentially without latency.

After the last pixel 310 of memory row 0 has been provided, activate commands for memory row 1, bank 0 and memory row 1, bank 1 are issued. These commands cause the next memory row, row 1, to be brought into the internal caches of the memory devices 216, 218, 220, 222 and 224. As described above, this operation delays the memory from providing the addressed pixel value 312. Once this pixel value has been provided, however, the 255 remaining pixels in memory row 1 are then provided essentially without latency. As described above, for a 2048×2048 image, a total of 8 memory rows (including row 0) are brought into the internal cache memories of the memory devices to access all of the pixels in a column.

Although the present invention is described in terms of SDRAM devices which use activate commands to transfer a memory row into the internal cache memory of the device, it is contemplated that other types of memory may be used in which, for example, a memory read request for one memory cell simultaneously activates the memory row and returns the requested value. In this instance, the activate commands may be replaced by explicit read commands for the first pixel to be provided by the transpose memory 112 or 116.

FIGS. 4A and 4B are memory map diagrams which illustrate how the input pixels are stored into the memory devices 216, 218, 220, 222 and 224. The notation used in FIGS. 4A and 4B indicates an initial line number and the sample group that is stored in a particular memory bank. For example, the legend L1S1–8 in memory row 0 of bank 0 of memory device 216 indicates that the first group of samples stored in memory row 0 is samples 1–8 of image line 1. As described above, corresponding samples from consecutive lines are stored in the same memory row of the memory bank and samples from the next lines are stored in the opposite memory bank of the same device. As shown in FIG. 4A, for example, the first group of samples stored in memory row 0 of bank 1 of memory device 216 are samples 1–8 of image line 33. Accordingly, memory row 0 of bank 0 of memory device 216 holds samples 1–8 of the first 32 lines of the image. In the exemplary embodiment of the invention, the memory addressing scheme uses alternating banks in a single memory row to interleave the memory write operations, and when memory row is filled up it may alternately store samples from a first set of lines in one bank of a memory row and store the samples from the next set of lines may in the opposite memory bank of a different device or in the opposite bank of another memory row (e.g. the next row) of the same device.

FIG. 4A shows how the image data is stored into the four one-Mb by 16-bit memories 216, 218, 220 and 222 while FIG. 4B shows how the corresponding image data is stored into the four-Mb by four-bit memory 224. The memory layout for the memory 224 shows how the addressing scheme of that memory is related to the addressing scheme used in the four one-Mb by 16-bit memories.

FIGS. 4A and 4B also show how image data are written into the various memory devices. As shown in FIG. 4A, pixel samples 1–8 of image line 1 are written into memory row 0 of memory bank 0 of device 216. The next eight pixels, samples 8–16 of image line 1 are written into memory row 8 of bank 1 of device 216. These samples are written into bank 1 so that the memory set-up operations for these samples may be overlapped with the data write operations that store samples 1–8 of line 1 in the other memory bank. As shown in FIG. 4B pixel samples are written into the four-Mb by four-bit memory device 224 using a similar scheme. Pixel samples 1–8 of image line 1 are written into row 0 of bank 0 of device 224 and pixel samples 9–16 of image line 1 are written into row 8 of bank 1. As shown in FIGS. 4A and 4B, groups of eight consecutive samples from 32 consecutive lines are stored in one memory bank while the groups of eight consecutive samples from the next 32 consecutive lines are stored in the next sequential memory bank. There are eight memory rows for each sample group to be able to accommodate 2048 lines. As shown in FIG. 4A, samples 1–8 of lines 2017 through 2048 are stored in memory row 7 of bank 1 of memory device 222.

If image sizes less than 2048 by 2048 pixels are used then, as set forth in Table 1, fewer memory devices may be used. If, for example, the image stored by the transpose memory has 1024 image lines, memory devices 220 and 222 may be eliminated and only one-half of each memory bank of device 224 may be used. In this instance, each memory row holds only 128 image pixels.

Figure 5A:
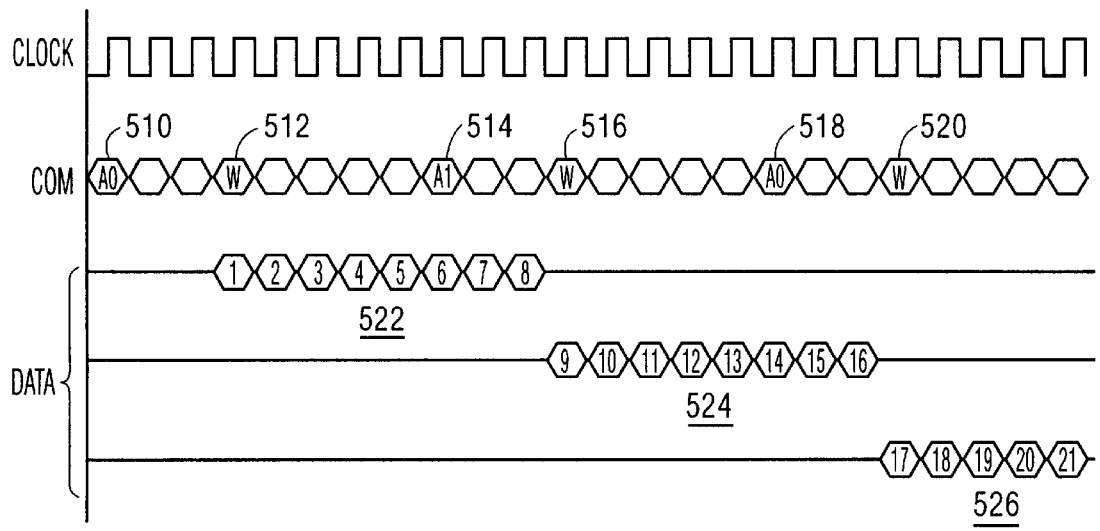
FIG. 5A is a timing diagram which illustrates consecutive write operations in to the one-Mb by 16-bit memories shown in FIG. 2.
Figure 5B:
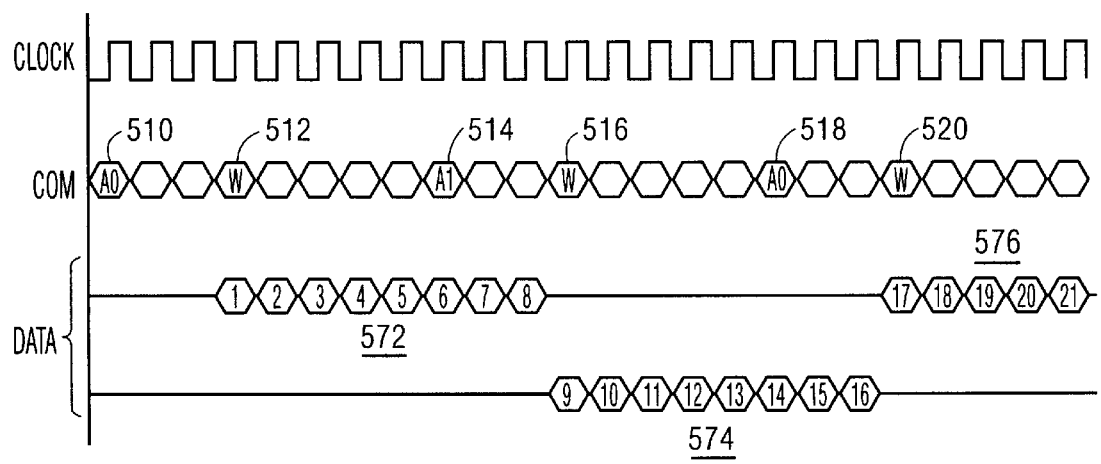
FIG. 5B is a timing diagram which illustrates consecutive memory write operations into the four Mb by four-bit memory devices shown in FIG. 2.

As described above, memory write operations which store consecutive pixel groups from a single image line may be overlapped in that the setup (write operation and row activation) for the next write operation occurs during the data transfer portion of the current memory write operation. Accordingly, the image pixels may be stored into the memory in real time, as they are provided. FIG. 5A and 5B illustrate the interleaving of the memory write operations to the memory banks of the memory devices shown in FIG. 2 as pixel samples 1–21 are written into the memory devices. As shown in FIGS. 5A and 5B, memory write operations are synchronized to a pixel clock signal, CLOCK. FIGS. 5A and 5B also show the command line COM and the data bus DATA. The data bus is shown as three lines in FIG. 5A and as two lines in FIG. 5B to simplify the description of the interleaved memory write operations. As shown in FIG. 2, however, the data bus DATA is a single 16-bit bus for the one-Mb by 16-bit devices and a single four-bit bus for the four-Mb by four-bit memory device.

The first memory operation shown in FIG. 5A is an activate command which activates memory row 0 of bank 0 of memory device 216. To implement this command, the chip select lines CS are set to /CS1 in order to select memory device 216. At the same time, an activate command 510 for memory row 0, bank 0 is asserted on the command line COM. In response to this command, the addressed memory row is brought into the internal cache memory for bank 0. Two periods of the clock signal later, a write command 512 for memory columns 0–7 is asserted on the COM line and the first of the eight pixel samples are provided on the DATA bus. The write command 512 is a block-write command having a block size of eight. In response to this command, memory device 216 stores the values 522 on the DATA bus for this cycle of the clock signal and for the next seven cycles of the clock signal into the first eight memory cells of the addressed memory row in the cache memory, overwriting the previous contents of those memory cells.

While these pixel samples are being written into the memory 216, a second activate command, 514, is asserted on the COM line to activate memory row 8 of bank 1 of memory device 216. For this command, the values of the CS signals do not change. In response to this command, memory row 8 is brought into the internal cache memory for bank 1. Next, a memory write command 516 is asserted to store image samples 9–16 of the first image line into the first eight cells of the memory row 8 of bank 1 of memory device 216. While this data is being stored, a next activate command 518 is asserted to activate memory row 16, bank 0 of memory device 216 if only one one Mb by 16-bit memory device is in the system or memory device 218 if the memory configuration includes more than one-Mb by 16-bit memory device.

Because this memory row is different from the currently active row in bank 0, the memory device 216 first stores the contents of the cache memory into the previously activated row (row 0) of the memory devices and then fetches the contents of memory row 16 into the bank 0 cache memory of the appropriate memory device. The memory write command 520 causes samples 17–24 of the first image line (samples 17 through 21 of which are shown as the sample group 526) to be stored into the first eight cells of the cache memory. The memory write operations alternate between bank 0 and bank 1 with the activate and addressing commands for one bank being asserted during the data transfer for the other bank. Using this scheme, once the latency for the initial write operation has occurred, the image data may be written into the transpose memory 112 or 116 in real time, as it is received.

As described above, the initial activate commands for the write operations which store a line of image data into the one-Mb by 16-bit memories begin at bank 0 of device 216. As more image samples for the line are received, they are stored into successive ones of the memory devices 218, 220 and 222, still alternating between the banks. Using the storage scheme described above, corresponding groups of image samples (e.g. pixels 1–8) of each line on the image are stored sequentially in contiguous memory rows (e.g. memory rows 0–7). In the described exemplary embodiment, pixels 1–8 of the first image line are stored in bank 0 of device 216 while pixels 1–8 of line 2048 are stored in bank 1 of device 222. Because samples 9–16 are stored starting in bank 1 of device 216, however, pixels 9–16 of line 2048 are stored in bank 0 of device 216. Thus, the memory addressing space "wraps around" in the device sequence 216, 218, 220, 222, 216, 218, . . . etc.

In the exemplary embodiment of the invention, the starting memory device for consecutive sample groups alternates between bank 0 and bank 1 of device 216. Alternatively, the first memory write operations for an image line may also sequence through the memory devices 216, 218, 220 and 222 in addition to alternating between the banks. As long as the bank-switching commands for the one-Mb by 16-bit memories and the four-Mb by four-bit memory 224 remain the same, the same addresses (including the chip-select signals, CS) may be used to store image data into both memories. If this alternate scheme were used, then pixel group 522 of FIG. 5A would be stored into bank 0 of device 216 while groups 524 and 526 are stored into bank 1 of device 216 and bank 0 of device 218, respectively.

FIG. 5B illustrates the operation of storing the LSB data into the four-Mb by four-bit memory 224. The commands presented on the command line are the same except that the chip select signals, CS, are combined with the address values so that the greater number of memory columns in the device 224 may be addressed. Accordingly, as shown in FIG. 2, a 12-bit address value is applied to the one-Mb by 16-bit memories while a 16-bit address value is applied to the four-Mb by four-bit memory. The LSB sample groups 572, 574 and 576 have a one-to-one correspondence with the sample groups 522, 524 and 526, shown in FIG. 5A.

Figure 6A:
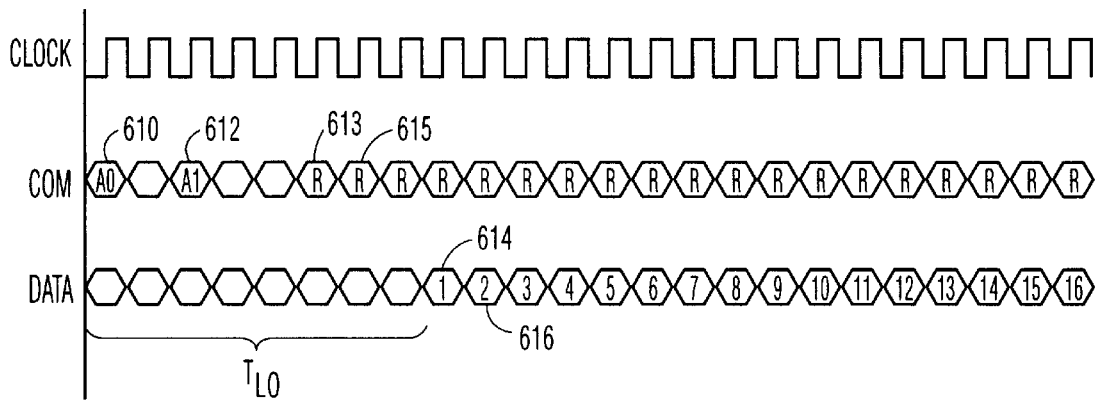
FIGS. 6A and 6B are timing diagrams which illustrate the manner in which columns of image data are read from the memory system shown in FIG. 2.
Figure 6B:
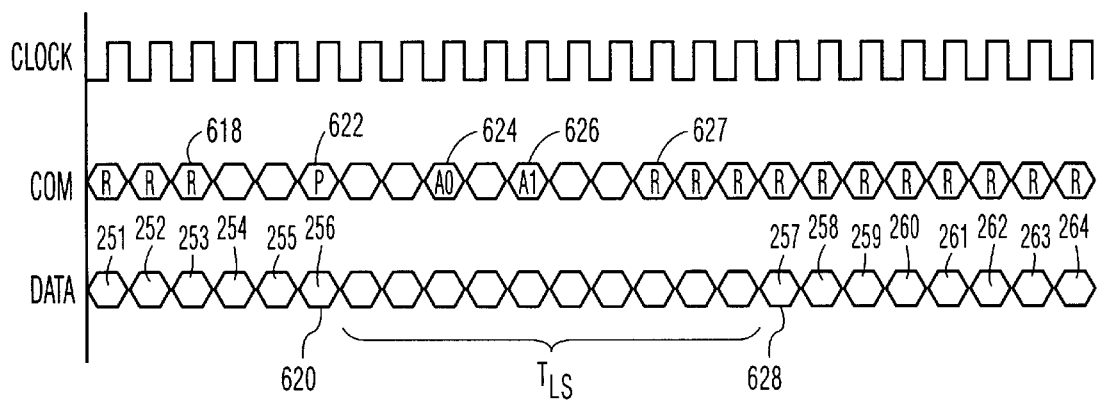

FIGS. 6A and 6B illustrate the operation of reading data from the memories 216, 218, 220, 222 and 224. Because, as described above, the address values applied to the one-Mb by 16-bit memories are augmented by the CS signals and applied to the four-Mb by four-bit memory, no separate timing diagram is shown for the four-Mb by four-bit memory.

As shown in FIG. 6A, a memory read operation begins with an activate command 610 which activates row 0, bank 0 of all of the memory devices 216, 218, 220, 222 and 224. Two clock periods later, a second activate command, 612, is asserted which activates row 0, bank 1 of all of the memory devices. After a delay of one clock period, the first read command, 613, is asserted to fetch, for example, image column 1 of line 1 from the memories. This command is followed immediately by read command 615 which fetches image column 1 of line 2. The respective requested samples 614 and 616 are provided after three clock cycles because the memories 216, 218, 220, 222 and 224 used in the exemplary embodiment of the invention have a read latency of three clock periods.

Because every bank of every memory device in the image memory has been activated, the internal cache memories hold the entire memory row 0. Thus, 256 consecutive pixels of image column 1 may be accessed without latency after the first pixel sample, 614, is provided. Accordingly, the read commands continue until command 618 which fetches the $256^{th}$ pixel, 620, from image column 1. After this pixel has been fetched and is being provided, the controller issues a precharge command 622 which precharges the address input ports of both banks of all of the memory devices 216, 218, 220, 222 and 224. After a delay of three clock periods and five clock periods, respectively, activate commands are asserted for memory row 1, bank 0 and memory row 1, bank 1 respectively. After a delay of one more clock period, the read command, 627, for pixel 257 from image row 1 is asserted. Following the read latency of three clock periods, the $257^{th}$ pixel, 628, is provided by the memory. The read operations continue from memory row 1 until column pixels 257 through 512 have been read from the memories.

As shown in FIGS. 6A and 6B, the memory read operations define two latency increments, an initial increment, $T_{L0}$, and a steady-state latency increment, $T_{LS}$. In order to provide the samples from the image column as a continuous stream, in real time, the time at which the first activate command 610 is asserted is advanced into the vertical blanking interval 124 (shown in FIG. 1A). The amount of time, TA, by which this command is advanced can be calculated as $T_{L0}+7T_{LS}$, if the memory configurations shown in Table 1 are used or $T_{L0}+15T_{LS}$ if the memory configurations shown in Table 2 are used. In response to these commands, the memory 212 provides samples of the image column 1 in bursts of 256 pixels, separated by the latency increment $T_{LS}$. In order to provide a uninterrupted pixel stream, the data provided by the memory 212 is first buffered through a first-in-first-out (FIFO) memory. Because the start of the read operation is advanced into the vertical blanking interval by the total of the memory latency for reading the entire column, the FIFO memory can provide the pixel data for the column in real time.

It is noted that the memory read operations and memory write operations described above are complementary. By simply inverting the write/read signal, the operations may be reversed. Accordingly, lines (columns) of memory may be written into the memory across several memory rows while columns (lines) and read from the memory from in interleaved read operations from two banks of a single memory row.

Figure 7:
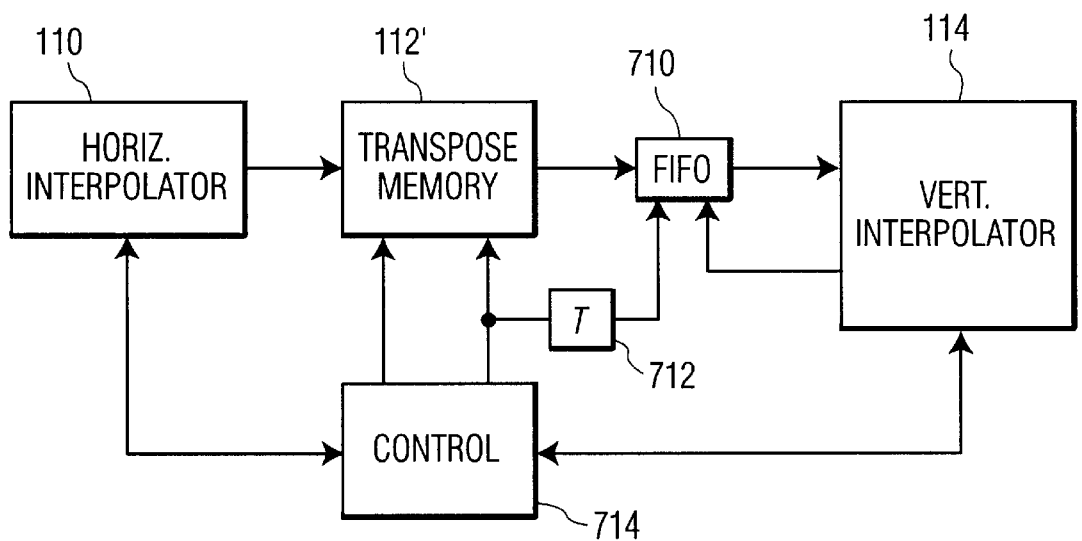
FIG. 7 is a block diagram showing details of the configuration of the transpose memory 112 shown in FIG. 1.

FIG. 7 is a block diagram which shows details of an exemplary coupling between the horizontal interpolator 110, a transpose memory 112' according to the present invention, and vertical interpolator 114. The overall operation of these devices is described above with reference to FIG. 1. In FIG. 7, the horizontally interpolated image pixels provided by the horizontal 110 are applied to the transpose memory 112'. The pixel values provided by interpolator 110 include both the active pixel elements and null pixel values representing the horizontal and vertical blanking intervals. The pixel values are provided to the transpose memory 112', described above with reference to FIG. 1, responsive to a controller 714. The controller 714 controls the horizontal interpolator 110, transpose memory 112' and vertical interpolator 114. It monitors the video signal as it is received, controls the interpolator to expand or shrink the image in the horizontal direction as appropriate. The controller 714 also controls the memory 112' to store the interpolated image data line-by-line as it is provided by the interpolator 110 and to provide the transposed image data column-by-column to the vertical interpolator 114. In addition, the controller 714 controls the vertical interpolator 114 to expand or shrink the image in the vertical direction as appropriate for the format conversion being performed.

As shown in FIG. 7, the image data provided by the transpose memory 112' are buffered through a FIFO memory 710 before being provided to the vertical interpolator 114. In the exemplary embodiment of the invention, the FIFO memory 710 is controlled by the controller 714 to receive the columns of video samples as they are provided by the memory 112' and to provide the pixel samples to the vertical interpolator 114 with proper timing for a video signal (i.e. without the latency gaps between groups of samples (e.g. 256, 192, 128 or 64 samples in a group)). Thus, in the exemplary embodiment of the invention, the FIFO memory 710 holds only a number of samples that equal the number of clock periods in the latency period TA, as described above.

FIG. 7 includes a compensating delay element 712 that delays the signal, which is applied to the transpose memory 112 to read the image data, by an amount of time, T, to provide the control signal for the FIFO buffer 710. The delay element 712 compensates for the propagation delay from the memory devices of the transpose memory 112 to the FIFO memory 710.

Figure 8:
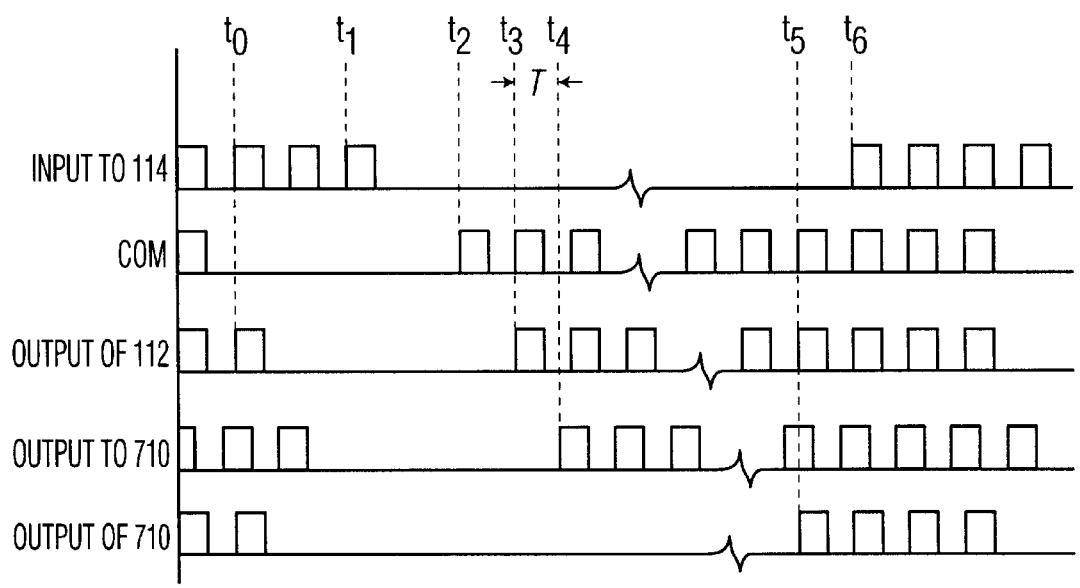
FIG. 8 is a timing diagram which is useful for describing the operation of the circuitry shown FIG. 7.

FIG. 8 is a timing diagram which illustrates the operation of the exemplary circuitry shown in FIG. 7. As shown in FIG. 8, at time $t_0$, the memory 1112 provides the last sample of the previous column. This sample is provided through the FIFO memory 170 to the vertical interpolator 114 at time $t_1$. Time $t_1$ is the last active sample period of the vertical column. The vertical blanking interval begins for the vertical interpolator 114 after the sample at time $t_1$ has been provided.

The memory devices 216, 218, 220, 222 and 224 are dynamic random access memory devices. Accordingly, their contents must be periodically refreshed only if the each pixel in the image is not accessed from the memory at least once during the 64 ms refresh interval. Typically, video memories are refreshed once per field or frame during the vertical blanking interval. Alternatively, the memories may be refreshed piecemeal, a few memory rows at a time, during multiple idle intervals. In the exemplary embodiment of the invention, if the entire memory is refreshed during a blanking interval, it is desirable to do so during a blanking interval for a memory write operation or at the start of a blanking interval for a memory read operation so that the refresh operation does not interfere with the memory read commands that are advanced into the blanking interval as described above.

As described above, during the vertical blanking interval and in response to commands on the command bus COM (shown in FIG. 2) which begin at time $t_2$, the memory 112 provides image data, starting at time $t_3$. At time $t_4$, after a delay of T from time $t_3$, the image pixels are provided to the FIFO memory 710. At time $t_5$, the last sample period of the vertical blanking interval, the FIFO memory 710 is controlled by the controller 714 to provide image pixels to the vertical interpolator 114. At time $t_6$, the start of the time in the sample stream that active pixels should be provided, the columns of pixels provided by the FIFO memory 710 are received by the vertical interpolator 114. The interpolator 114 receives the column of pixel values from the FIFO memory 710 in an uninterrupted stream of, for example, 2048 pixels until the start of the next vertical blanking interval.

The system described above uses relatively inexpensive SDRAM devices to implement a field-store or frame-store image transpose memory by storing the image data into the memory in a particular sequence which allows blocks of image data in the transposed direction to be fetched without latency. Any latency between the fetched, transposed blocks is absorbed in the blanking interval in the transposed direction.

While the invention has been described in terms of an exemplary embodiment, it is contemplated that it may be practiced as described above within the scope of the appended claims.

What is claimed:

1. A memory system for transposing picture elements (pixels) of an image, which pixels are received as a first stream of pixels that would generate an image by being scanned across a display in a first direction, to produce a second stream of pixels that would generate the image by being scanned across the display in a second direction orthogonal to the first direction, the memory system comprising:

a memory device having a plurality of memory cells arranged in first and second banks of memory rows so that any of the pixels in a memory row are accessed without set-up latency after the row has been activated and so that memory write operations to the first bank are interleaved with memory write operations to the second bank;

a memory controller, coupled to the memory device and configured to store the first stream of pixels into the memory device as successive groups of pixels so that groups of pixels which contain adjacent pixels in the second direction are stored in corresponding ones of the plurality of memory rows wherein, when the memory controller activates one memory row in the memory device, one of the pixels and a plurality of pixels which are consecutively adjacent, in the second direction, to the one pixel are available for access as a continuous stream, wherein the memory controller is further configured to store consecutive ones of the groups of pixels into alternate ones of the first and second memory banks so that any memory addressing operation for one memory write operation overlaps with the string of the group of pixels from a previous write operation.

2. A memory system according to claim 1, wherein the memory device is an synchronous dynamic random access (SDRAM) memory device.

3. A memory system according to claim 2, wherein:

each memory write operation occurs in response to a memory write command having a read/write bit in a first polarity and each memory read operation occurs in response to a memory read command having the read/write bit in a second polarity, opposite to the first polarity; and the memory read operations are converted into memory write operations and the memory write operations are converted into memory read operations by inverting the polarity of the read/write bit in each of the commands.

4. A memory system according to claim 1, wherein each scan line of pixels in the second direction includes a blanking interval and an active interval, a number, N, memory rows are accessed to read a single scan line of pixels in the second direction and each row access includes a predetermined set-up latency period, T, wherein, the memory controller is further configured to start a first read operation, for a first memory row of a scan line of pixels in the second direction, during the blanking interval, an amount of time, N*T, before the active interval.

5. A memory system according to claim 4, further including a first in first out (FIFO) buffer which receives the image data as it is provided from the memory in response to the read operations and provides the scan lines of pixels in the second direction continuously, as the second stream of pixels.

6. A memory system according to claim 5, further comprising a further memory device coupled to the memory controller, wherein the memory controller is configured to control the first memory device to perform successive write operations while controlling the second memory device to perform successive read operations and to control the first memory device to perform successive read operations while controlling the second memory device to perform successive write operations.

7. A memory system according to claim 6, wherein each pixel includes 20 bits comprising a 10-bit luminance value and a 10-bit chrominance value and the memory includes a plurality of one-megabit (Mb) by 16-bit SDRAM devices which hold the eight most significant bits (MSBs) of the luminance values and the chrominance values and one four Mb by four-bit SDRAM device which holds the two least significant bits (LSBs) of the luminance and chrominance values.

8. A method for transposing a first stream of picture element (pixel) data, which would form an image by scanning successive lines of the first stream of pixel data in a first direction, to produce a second stream of pixel data which would form the image by scanning finer successive lines of the second stream of pixel data in a second direction orthogonal to the first direction, using a memory which is arranged as first and second banks of memory rows, each of tee pixels in a memory row being accessed essentially without set-up latency once memory row has been activated, the method comprising the steps of:

forming the first stream of pixel data into successive groups of adjacent pixels;

storing successive groups of pixels alternately into the first and second banks of respective memory rows so that any set-up latency for storing one group of pixels in one bank of the memory occurs while pixel data is being stored into the other bank of the memory, wherein the groups of pixels stored in each memory row are consecutively adjacent in the second direction;

accessing one of the memory rows;

accessing a first pixel from the memory row; and accessing corresponding pixels in all groups of pixels in the memory row to produce the second stream of pixel data.

9. A method according to claim 8, wherein each memory write operation occurs in response to a memory write command having a read/write bit in a first polarity and each memory read operation occurs in response to a memory read command having the read/write bit in a second polarity, opposite to the first polarity and the method further includes the step of converting the memory read operations into memory write operations and the memory write operations into memory read operations by inverting the polarity of the read/write bit in each of the commands.

10. A method according to claim 8, wherein each scan line of pixels in the second direction includes a blanking interval and an active interval, and a number, N, memory rows are accessed to read a single scan line of pixels in the second direction, each memory access operation including a predetermined set-up latency period, T, the step of accessing one of the memory rows including the step of issuing a memory activation command, to start the memory read operation for the one memory row during the blanking interval an amount of time, N*T, before the active interval.

11. A method according to claim 8, further including the step of storing the pixels provided by the one memory row into a first-in-first-out (FGFO) memory device so that pixels provided from multiple memory rows are provided as a continuous stream.

* * * * *

UNITED STATES PATENT AND TRADEMARK OFFICE
CERTIFICATE OF CORRECTION

PATENT NO.    : 6,496,192 B1
DATED         : December 17, 2002
INVENTOR(S)   : Vasanth Shreesha and David Nasoff It is certified that error appears in the above-identified patent and that said Letters Patent is hereby corrected as shown below:

Column 12,
Line 43, "string" should read -- storing --.

Column 14,
Line 35, "(FGFO)" should read -- (FIFO) --.

Signed and Sealed this

Eighteenth Day of March, 2003

JAMES E. ROGAN
*Director of the United States Patent and Trademark Office*